(12) United States Patent
Zweigle et al.

(10) Patent No.: US 8,167,642 B2
(45) Date of Patent: May 1, 2012

(54) COMPONENT CONNECTOR WITH SLIDING INSULATION CUTTING CLAMP

(75) Inventors: Peter Zweigle, Ditzingen (DE); Christian Arens, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 111 days.

(21) Appl. No.: 12/487,219

(22) Filed: Jun. 18, 2009

(65) Prior Publication Data
US 2009/0318012 A1 Dec. 24, 2009

(30) Foreign Application Priority Data
Jun. 18, 2008 (DE) .......................... 10 2008 002 506

(51) Int. Cl.
*H01R 4/24* (2006.01)
(52) U.S. Cl. ....................................................... 439/435
(58) Field of Classification Search .................. 439/435, 439/417, 387
See application file for complete search history.

(56) References Cited

U.S. PATENT DOCUMENTS
7,156,689 B2 * 1/2007 Fabian et al. .................. 439/417
7,186,132 B2 * 3/2007 Quintanilla .................... 439/417

FOREIGN PATENT DOCUMENTS
DE  102 22 200  11/2003

* cited by examiner

*Primary Examiner* — Vanessa Girardi
(74) *Attorney, Agent, or Firm* — Kenyon & Kenyon LLP

(57) ABSTRACT

An electrical apparatus, in particular a sensor or a control unit, includes at least one component that has at least one contacting device such as a pin or a wire, where the contacting device engages a clamping section of a housing part to produce an electrical connection and has a longitudinal axis, the clamping section being formed as part of a sliding device that is situated in the housing part and is movable transversely to the longitudinal axis of the contacting device.

11 Claims, 2 Drawing Sheets

COMPONENT CONNECTOR WITH SLIDING INSULATION CUTTING CLAMP

FIELD OF THE INVENTION

The present invention relates to an electrical apparatus, in particular a sensor or a control unit, having at least one component that has at least one contacting device such as a pin or a wire, where the contacting device engages a clamping section of a housing part to produce an electrical connection and has a longitudinal axis.

BACKGROUND INFORMATION

The use of cut-and-clamp and clamping techniques is known from the related art, such as cut-and-clamp connections, which are also known as ID connections, for insulation displacement. Such insulation displacement connections are solderless, permanent electrical connections which are produced by pressing a conductor into a tapered slot in a terminal. Such a conductor is either a single wire, is made up of a plurality of wire strands, or is a solid metal pin.

When the conductor is inserted into the slot the flanks of the slot displace any insulation that is present, deform the conductor, and thus make a gas-tight connection possible. Those properties are also set forth in the DIN standard DIN EN 60 352-4.

After the conductor is positioned over the insulation displacement connection, which may also be designed as a clamp connection without the cutting component, it is pressed into the insulation displacement connection in the joining direction, possibly using a connecting tool. Such insulation displacement connections, or corresponding clamping connections in a modified form, enable the conductor to be joined and make contact with an element requiring electrical connection in a single step in one direction. The configuration of such insulation displacement connections as a strain relief is also known. In this case, two insulation displacement connections, having appropriate slots that act as connecting slots, are connected one after the other in the longitudinal direction of a conductor and are kept separated from each other by a spacing section.

Up to now, however, soldering and/or welding processes have been used to make contact with electrical components such as sensors that permit only low contacting forces.

But such welding processes have the disadvantage that they are energy- and labor-intensive. Furthermore, the joints produced cannot be separated again.

An electrical apparatus is described in, for example, German Patent No. DE 102 22 200, in which an electrical contact element is inserted into a base plate to produce a contact. At the same time an ultrasound effect is introduced into the electrical apparatus in the area of contact, in order to increase the reliability of the electrical connection and to rework the contact zone in a way that is similar to soldering.

SUMMARY OF THE INVENTION

An electrical apparatus according to the present invention, in particular a sensor or a control unit, having at least one component that has at least one contacting device such as a pin or a wire, where the contacting device engages a clamping section of a housing part to produce an electrical connection and has a longitudinal axis, is further designed so that the clamping section is formed as part of a sliding device that is situated in the housing part and is movable transversely to the longitudinal axis of the contacting device.

Such a form of an electrical apparatus according to the present invention enables contact to be made with a component of the electrical apparatus in a simple and cost-effective manner, with no great forces being exerted in the longitudinal direction of the contacting device and thermal warming being prevented, which minimizes rejects when producing such electrical devices.

Contacting can be accomplished on the one hand by shaping both partners to the contact, i.e., by deforming the clamping section elastically and the contacting device plastically, and on the other hand by achieving the contact essentially only through the preferably elastic deformation of the clamping section. In both cases only slight forces are exerted in the longitudinal direction of the contacting device, which again increases the reliability of the electrical apparatus. Furthermore, contact may be made simply even with very hard conductors, in particular sensors or circuit boards, which increases the possibilities of use for the electrical apparatus. In particular, pressure sensors may be designed in this way.

The design according to the present invention also causes a contacting area to be enclosed by the housing part in such a way that this area of the electrical component is completely protected from fouling, for example by shavings. The electrical apparatus thus remains fail-safe even in long-term use.

For example, it is particularly advantageous if the clamping section is designed in such a way that it fulfills a cutting function in addition to the clamping function, in order to cut through an insulation layer that surrounds the contacting device. This makes it possible to eliminate one work step in production, namely the stripping of the contacting device, thus saving both time and expense.

If the electrical connection between the sliding device and the contacting device is producible by moving the sliding device orthogonally to the longitudinal axis of the contacting device, then the electrical device can be designed more compactly, in particular flatter, and available installation space for the electrical apparatus can be better utilized. When installing the apparatus in motor vehicles, this also enables the weight to be reduced, which contributes correspondingly to reducing fuel consumption.

To enable the operating personnel to achieve particularly reliable contacting easily when installing the electrical apparatus, it is advantageous if the sliding device is movable toward the contacting device to achieve the electrical contact.

A proven alternative is also when the sliding device is movable away from the contacting device to achieve the electrical contact.

The design of the sliding device as a metal conductor track, preferably as a stamped mesh track, has proven to be particularly durable. Furthermore, a sliding device designed in this way may be produced particularly economically.

If the sliding device has an opening through which the contacting device protrudes, with the opening having a constricted area on one side of the contacting device whose width is smaller than the width of the contacting device in this vicinity, a clamping that produces the electrical connection can be realized particularly effectively.

To realize the function independently of the direction of sliding, it has proven to be advantageous if the constricted area is situated ahead of the contacting device when viewed in the direction of motion of the sliding device.

If the electrical component has at least two contacting devices, such as two pins or two wires, then it is also particularly simple to make contact with sensors operated by direct current, such as 12 V or 24 V sensors of a motor vehicle.

In order to be able to support joining forces that occur using auxiliary geometries, it is advantageous if the housing part partially encloses the electrical component, and preferably has a cutout on a side opposite the electrical component to achieve tolerance compensation. Furthermore, the contacting area is then enclosed particularly effectively by the housing part, which increases the protection against fouling still further.

DETAILED DESCRIPTION

Figure 1:
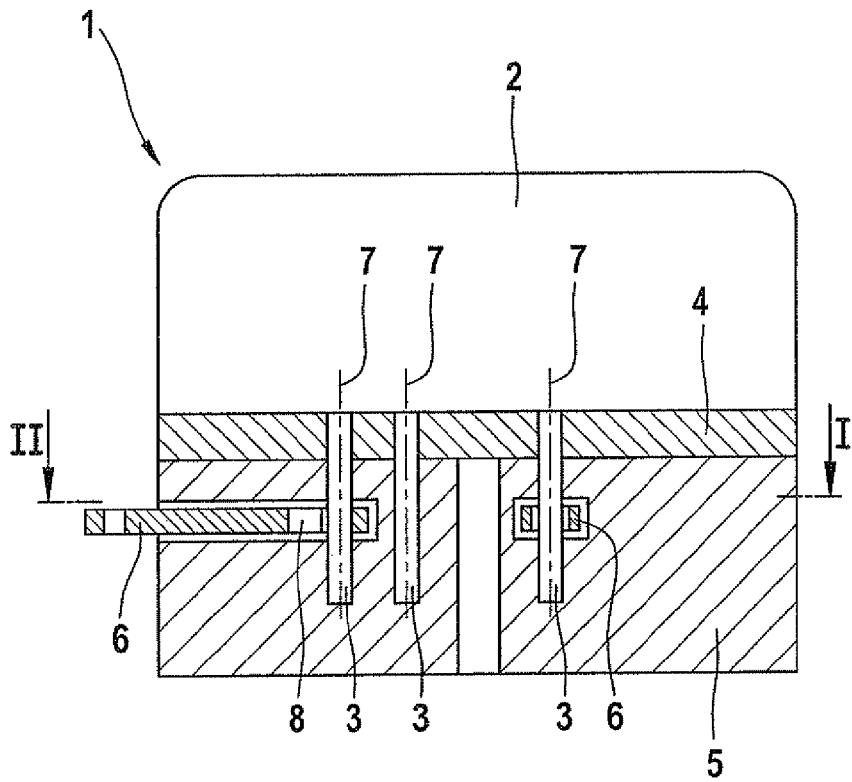
FIG. 1 shows a schematic sectional view of an electrical apparatus according to the present invention, in cross section.

FIG. 1 shows an electrical apparatus according to the present invention in a staggered cross section. The shape of the staggered cross section may be seen in FIG. 2, where it is provided with reference numeral I.

Electrical device 1 has an electrical component 2 on its top which is a sensor or control unit, in particular a pressure sensor. Electrical component 2 has at least one contacting device 3. Contacting device 3 is either a pin, a wire, a braided strand, or a similar component.

In the lower zone of electrical component 2 a fixing material 4 is applied, which is made in particular of glass or epoxy resin and which fixes at least one contacting device 3. Fixing material 4 encloses at least part of contacting device 3, and does not have to cover the entire cross-sectional area of electrical component 2 as shown.

The connection of contacting device 3 with circuit elements in electrical component 2 is not shown. Conventional approaches for this are adequately known from the related art.

Electrical device 1 has a housing part 5 beneath electrical component 2, in particular beneath fixing material 4. The lower section of contacting device 3 is situated in housing part 5. Contacting device 3 is situated in such a way that housing part 5 functions as a counterpoise, in order to absorb joining forces.

Housing part 5 has slots in which sliding devices 6 are situated. Since the exemplary embodiment shown in FIG. 1 depicts three contacting devices 3, namely three pins, and contact is made with two of these pins using a sliding device 6, two sliding devices 6 are shown accordingly in FIG. 1.

Figure 2:
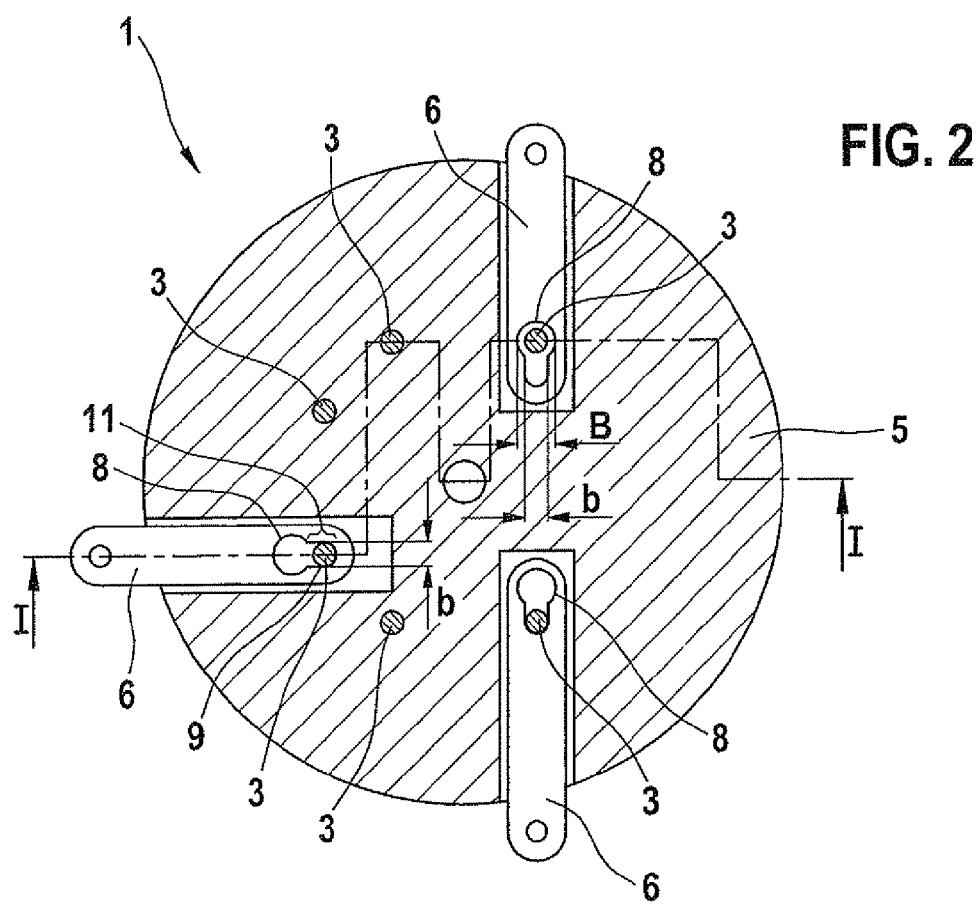
FIG. 2 shows a schematic view of the electrical apparatus from FIG. 1 along a sectional plane II.

As may be seen from FIG. 2, a total of six contacting devices 3 are situated in electrical apparatus 1, a total of three of which are each contacted by one sliding device 6.

It is apparent in FIG. 2 that two pins are already each contacted by a sliding device 6, whereas the pin shown in the first quadrant does not yet have an electrically conductive contact from the corresponding sliding device 6.

Sliding device 6 is movably situated in housing part 5.

Contacting devices 3 each have a longitudinal axis 7. Sliding devices 6 are designed to be movable orthogonally to this longitudinal axis.

In the exemplary embodiments depicted in FIGS. 1 through 4 sliding device 6 is a metal conductor track, in particular a stamped mesh track. These sliding devices 6 each have an opening 8. A contacting device 3 is inserted into each opening 8. Opening 8 has different widths, with the larger width being greater than a width b of contacting device 3.

Opening 8 also has a constricted zone 9. Constricted zone 9 has a width B, which is smaller than the width b of contacting device 3. Since contacting device 3 in the versions shown in the exemplary embodiments in FIGS. 1 through 4 has pins having a round cross section, width b is synonymous with the diameter of the pins.

The pins are permanently connected to sliding devices 6, namely the stamped mesh tracks, through a clamping device, or in the case of wires, through an insulation displacement connection, in the constricted zone 9 of sliding device 6, by tension forces or compression forces.

The electrical contacting is brought about by an orthogonal motion of sliding device 6 relative to longitudinal axis 7 of the contacting device.

Electrical contact is also made in this way on circuit boards that are provided with so-called through-hole mounting, namely using sliding device 6, which permanently connects the pins via a clamp connection or the wires via an insulation displacement connection, using tensile forces.

Instead of tensile forces, compression forces may also be used.

In the insulation displacement process and/or in the clamping process, to produce the electrical contact between sliding device 6 and contacting device 3 the pins or wires are located in housing part 5. During the processes of contacting, the latter serves as a counterpoise for the transverse forces that arise. If the insulation displacement and/or clamping connection has been made, housing part 5 can be removed again, and the electrical component, in particular for example the circuit board, can be taken out again, in contrast to what is depicted schematically in FIG. 1. A guide groove in which sliding device 6 is guided is then designed in such a way that it is open on top. In the exemplary embodiment depicted in FIGS. 1 and 2, housing part 5 thus does not remain on electrical component 2. This is contrary to the exemplary embodiment as depicted in FIGS. 3 and 4, in which housing part 5 remains on electrical component 2.

FIG. 2 shows the arrangement of sliding device 6 relative to housing part 5 and contacting devices 3. On the side opposite opening 8, sliding devices 6 have an additional opening, which is preferably a borehole in which for example contacting wires are engaged. Further electrical connecting devices engage sliding device 6 to close an electrical circuit. This is not shown in FIGS. 1 and 2.

Sliding devices 6 shown in the second and third quadrants are activatable by pressure, in such a way that when pressure-activated they establish an electrical contact with contacting device 3. In contrast to these two sliding devices 6, sliding device 6 in the first quadrant is a contacting device activatable by tension, which is positioned in the state shown in FIG. 2 so that electrical closure is not yet achieved.

Figure 3:
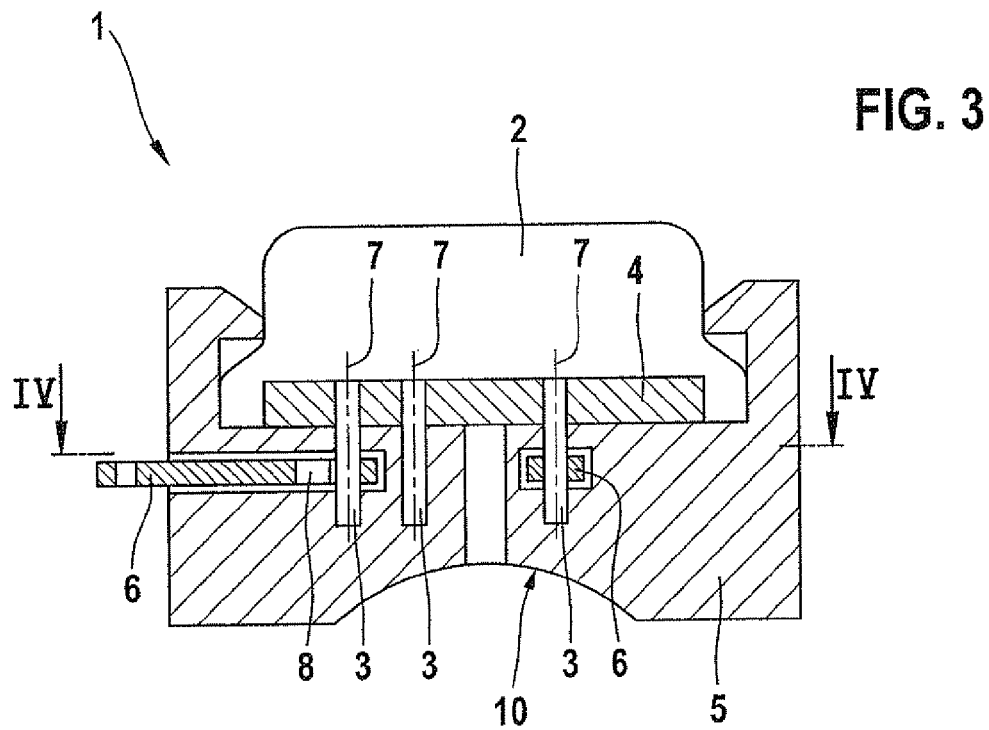
FIG. 3 shows a schematic view of a second exemplary embodiment of an electrical apparatus according to the present invention, shown in cross section.
Figure 4:
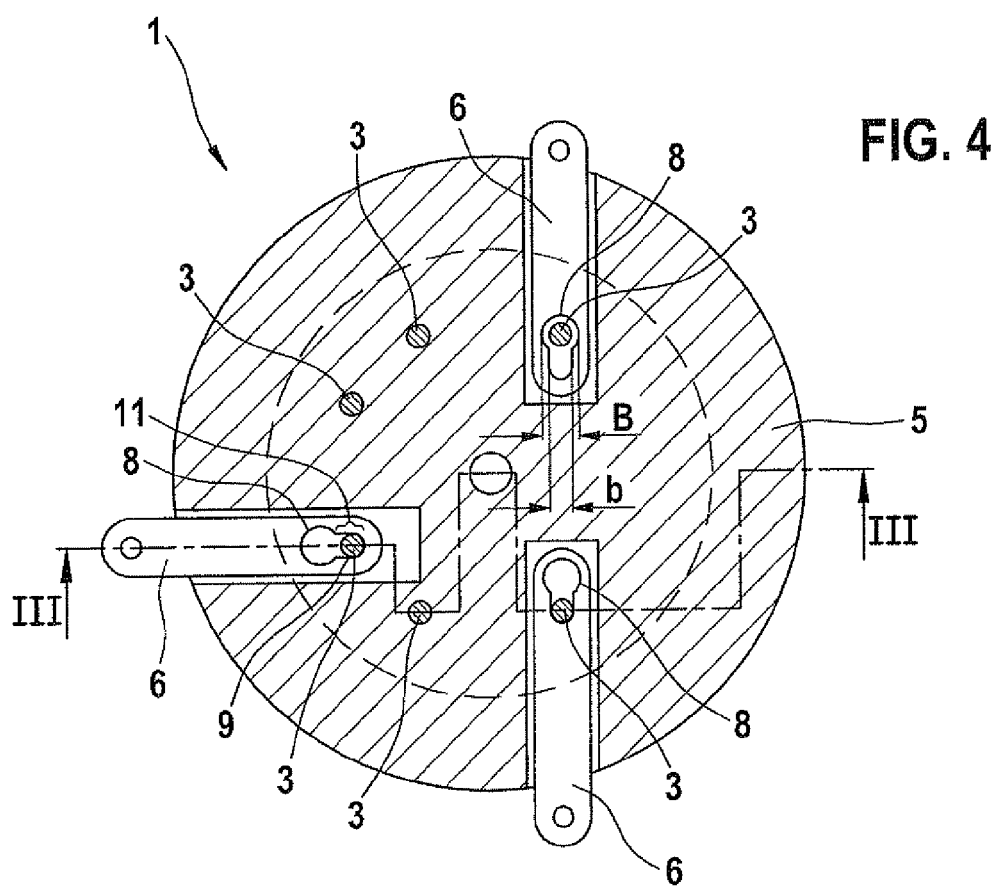
FIG. 4 shows a schematic view of the electrical component according to the present invention from FIG. 3 along a plane IV, shown in elevation view.

FIGS. 3 and 4 depict a second exemplary embodiment, the same reference numerals being used in this case for the same components.

As already explained, the exemplary embodiment depicted in FIGS. 3 and 4 differs in part in that housing part 5 at least partially encloses electrical component 2, so that these two components no longer separate after having been joined. A positive and/or frictional lock exists between the two components.

As in the first exemplary embodiment, sliding devices 6 are movably situated in cutouts in housing part 5. In the section of housing part 5 opposite electrical component 2, there is a funnel 10 for tolerance equalization to a hydraulic system to which electrical apparatus 1 is connectable. In the exemplary embodiment depicted, electrical component 2 has been integrated into housing part 5.

In this process, housing part 5 is first aligned and sliding devices 6 are inserted. Electrical component 2, i.e., in this case the sensor, which together with at least two contacting devices, namely two pins or two wires, is enclosed in a material such as glass, which constitutes fixing material 4 and is part of electrical component 2, is then fitted into housing part 5, in particular using a detent mechanism, in order to produce the electrical contact. The pins and/or wires are now permanently connected to sliding devices 6, namely the stamped meshed tracks, via a clamp connection for pins or an insulation displacement connection for wires, using tension or compression forces.

Housing part 5 again serves as a counterpoise for the occurring transverse forces during the cut-and-clamp process or during the clamping process. Electrical component 2 remains permanently integrated into housing part 5 after the insulation displacement connection has been made.

FIG. 4 indicates the outer border of electrical component 2 by a dashed line.

The method of achieving the electrical contact between contacting device 3 and sliding devices 6 is identical in both exemplary embodiments. Contacting devices 3 of electrical component 2 are inserted into housing part 5. Contacting devices 3 protrude through openings 8 in sliding devices 6. After the sliding devices are moved transversely to corresponding longitudinal axis 7 of contacting devices 3, the flanks of openings 8 cut away any insulation around contacting devices 3, so that the flanks come into clamping contact with contacting device 3 in the constricted zone 9. Constricted zone 9 of opening 8 forms a clamping section 11.

What is claimed is:

1. An electrical apparatus comprising:
   a housing part having a clamping section;
   at least one component including at least one contacting device having a pin or a wire, the contacting device engaging the clamping section of the housing part to produce an electrical connection and having a longitudinal axis; and
   a sliding device situated in the housing part and movable transversely to the longitudinal axis of the contacting device, the clamping section being formed as part of the sliding device,
   wherein the housing part at least partially encloses the component, and has a cutout on a side opposite the component to achieve tolerance compensation.

2. The electrical apparatus according to claim 1, wherein the clamping section, in addition to fulfilling a clamping function, is also adapted to fulfill a cutting function in order to cut through an insulation layer that surrounds the contacting device.

3. The electrical apparatus according to claim 1, wherein the sliding device is a metal conductor track, including a stamped mesh track.

4. The electrical apparatus according to claim 1, wherein the component includes at least two contacting devices, having two pins or two wires.

5. The electrical apparatus according to claim 1, wherein the electrical component is a sensor.

6. The electrical apparatus according to claim 1, wherein the electrical component is a control unit.

7. The electrical apparatus according to claim 1, wherein the sliding device has an opening through which the contacting device protrudes, the opening having a constricted area on one side of the contacting device whose width is smaller than a width of the contacting device in the area.

8. The electrical apparatus according to claim 7, wherein the constricted area is situated in front of the contacting device when viewed in a direction of motion of the sliding device.

9. The electrical apparatus according to claim 1, wherein the electrical connection between the sliding device and the contacting device is producible by a movement of the sliding device orthogonally to the longitudinal axis of the contacting device.

10. The electrical apparatus according to claim 9, wherein the sliding device is movable toward the contacting device to achieve the electrical contact.

11. The electrical apparatus according to claim 9, wherein the sliding device is movable away from the contacting device to achieve the electrical contact.

\* \* \* \* \*